US008130691B2

(12) United States Patent
Kimura et al.

(10) Patent No.: US 8,130,691 B2
(45) Date of Patent: Mar. 6, 2012

(54) RELAY APPARATUS, COMMUNICATION TERMINAL, AND COMMUNICATION METHOD

(75) Inventors: Hiroaki Kimura, Shinjuku (JP); Shingo Izawa, Shinjuku (JP); Takaaki Ishida, Fujisawa (JP); Kotaro Kataoka, Fujisawa (JP)

(73) Assignees: KDDI Corporation, Tokyo (JP); Keio University, Tokyo (JP)

( * ) Notice: Subject to any disclaimer, the term of this patent is extended or adjusted under 35 U.S.C. 154(b) by 377 days.

(21) Appl. No.: 12/101,267

(22) Filed: Apr. 11, 2008

(65) Prior Publication Data

US 2009/0046621 A1 Feb. 19, 2009

Related U.S. Application Data

(63) Continuation of application No. PCT/JP2006/320463, filed on Oct. 13, 2006.

(30) Foreign Application Priority Data

Oct. 13, 2005 (JP) ................................. 2005-299331

(51) Int. Cl.
*H04B 7/14* (2006.01)
(52) U.S. Cl. ....................................................... 370/315
(58) Field of Classification Search .................... 370/315
See application file for complete search history.

(56) References Cited

U.S. PATENT DOCUMENTS

| 6,788,681 | B1 * | 9/2004 | Hurren et al. | 370/389 |
| 6,816,704 | B1 | 11/2004 | Fukuda | |
| 2002/0031108 | A1 * | 3/2002 | Inoue | 370/338 |
| 2003/0162495 | A1 * | 8/2003 | Yonemoto et al. | 455/7 |
| 2004/0017918 | A1 * | 1/2004 | Nicolas | 380/279 |
| 2004/0210754 | A1 * | 10/2004 | Barron et al. | 713/153 |
| 2005/0044142 | A1 | 2/2005 | Garrec et al. | |
| 2005/0130611 | A1 * | 6/2005 | Lu et al. | 455/130 |

FOREIGN PATENT DOCUMENTS

| CN | 1561609 A | 1/2005 |
| JP | 11-220665 A | 8/1999 |
| JP | 2000-124956 A | 4/2000 |
| JP | 2001-211205 A | 8/2001 |
| JP | 2002-26842 A | 1/2002 |
| JP | 2003-78830 A | 3/2003 |
| JP | 2005-160005 A | 6/2005 |

(Continued)

OTHER PUBLICATIONS

International Search Report of PCT/JP2006/320463, date of mailing Dec. 26, 2006.

(Continued)

*Primary Examiner* — Ayaz Sheikh
*Assistant Examiner* — Hai-Chang Hsiung
(74) *Attorney, Agent, or Firm* — Westerman, Hattori, Daniels & Adrian, LLP

(57) ABSTRACT

A relay apparatus (110) includes a communication I/F (113) that receives an IP packet from a source terminal (120A) via a communication network (101), a broadcast wave interface (114) that transmits the IP packet received via the communication network I/F (113) to a destination terminal (120B) by a digital broadcast wave, and a receiving and transmitting unit (111) that transmits the IP packet that is received by the communication I/F (113) and transmitted by the transmitting communication terminal (120A) to the destination terminal (120B) via the broadcast wave I/F (114).

10 Claims, 5 Drawing Sheets

FOREIGN PATENT DOCUMENTS

| | | |
|---|---|---|
| JP | 2005-520370 A | 7/2005 |
| WO | 03/030451 A1 | 4/2003 |
| WO | 2004/051475 A1 | 6/2004 |
| WO | WO 2005043281 A2 * | 5/2005 |

OTHER PUBLICATIONS

Notification of Transmittal of Copies of Translation of the International Preliminary Report on Patentability (Form PCT/IB/338) of International Application No. PCT/JP2006/320463 mailed Apr. 24, 2008 with Forms PCT/IB/326, PCT/IB/373, PCT/ISA/237 and English translation form PCT/ISA/237.

Chinese Office Action dated Aug. 11, 2010, issued in corresponding Chinese Patent Application No. 200680037612.1.

Office Action issued on Jan. 17, 2011 in corresponding Japanese Patent Application 2007-540001.

Chinese Office Action dated Jul. 13, 2011, issued in corresponding Chinese Patent Application No. 200680037612.1.

Izumiyama, Hidetaka; "Multicast over Satellite", Information Processing Society of Japan, vol. 42, No. 8, Aug. 15, 2001, pp. 765-769. (Partial Translation) cited in Japanese Office Action dated Jul. 19, 2011.

Japanese Office Action dated Jul. 19, 2011, issued in corresponding Japanese Patent Application No. 2007-540001.

* cited by examiner

RELAY APPARATUS, COMMUNICATION TERMINAL, AND COMMUNICATION METHOD

TECHNICAL FIELD

The present invention relates to a relay apparatus, a communication terminal, and a communication method that perform real-time communication with a particular terminal by a broadcast wave.

BACKGROUND ART

Conventionally, a fixed network, a mobile network, and a local area network (LAN) are used as communication paths by which communication terminals communicate with each other. However, due to recent increasing communication demand, increased capacity and range of each communication path is required, the provision of optical fibers capable of data multiplexing and relay apparatuses for the mobile network and the wireless LAN has been progressing.

Meanwhile, a technique of utilizing digital broadcast waves has been researched as a new communication path for bidirectional communication. Conventionally, broadcast waves have been used to convey data, such as content (programs), to the general public. However, a technique of digitalizing broadcast waves has enabled broadcast waves carrying data in packets.

By such digital broadcast waves, bidirectional communication has been enabled between the transmitting side and the receiving side. In this technique, data can be exchanged via the Internet, a receiver that has received a digital broadcast can acquire information concerning a bidirectional web server related to the concerned broadcast content and communicate with the web server via the Internet, etc. (see, for example, Patent Document 1 below).

Patent Document 1: Japanese Patent Application Laid-open Publication No. 2003-78830

DISCLOSURE OF INVENTION

Problem to be Solved by the Invention

However, the bidirectional communication according to the transmission method disclosed in Patent Document 1 is a technique for communication between the side transmitting data and the side receiving the data, i.e., a broadcast station and a viewer, and has a problem in that real-time communication such as bidirectional communication with a particular user cannot be performed.

To solve the above problems, it is an object of the present invention to propose a relay apparatus, a communication terminal, and a communication method that can perform real-time bidirectional communication with a particular communication terminal using a broadcast wave as a communication path.

Means for Solving Problem

To solve the above problems and achieve an object of the present invention, a relay apparatus according to the invention of claim 1 includes a communication network interface that receives, via a communication network, an IP packet from a source terminal; a broadcast wave interface for transmitting the IP packet, received via the communication network interface, to a destination terminal via a digital broadcast wave; and a routing processing unit that broadcasts, from the broadcast wave interface, the IP packet received from the source terminal via the communication network, to the destination terminal.

A relay apparatus according to the invention of claim 2, based on the invention of claim 1, further includes a real-time communication unit that acquires address information of a plurality of terminals between which the IP packet is exchanged via the routing processing unit, and monitors a connection state.

A relay apparatus according to the invention of claim 3, based on the invention of claim 2, further includes a key issuing unit that issues, to the terminals, an encryption key and an decryption key for the IP packet to be exchanged among the terminals; issue information of the encryption key and the decryption key; and a key-information storing unit that stores addresses of the terminals issued the encryption key and the decryption key, in which the real-time communication unit requests, upon receiving, from any of the terminals, an IP packet requesting bidirectional communication, the key issuing unit to issue the encryption key and the decryption key.

A relay apparatus according the invention of claim 4, based on any one of claims 1 to 3, further includes an encapsulating unit that encapsulates the IP packet to be transmitted to the broadcast network via the broadcast wave interface to generate a transmission packet for the digital broadcast wave.

A terminal according to the invention of claim 5 includes a routing processing unit that judges, upon transmitting an IP packet to a particular terminal, whether the IP packet is to be transmitted to a relay apparatus based on a destination address of the IP packet, and sets the relay apparatus as a destination; a communication network interface that transmits, to a communication network, the IP packet for which the particular terminal has been set as the destination by the routing processing unit; and a broadcast wave interface that receives a digital broadcast wave and extracts an IP packet encapsulated therein.

A terminal according to the invention of claim 6, based on the invention of claim 5, further includes a key processing unit that requests the relay apparatus to issue an encryption key and a decryption key for transmitting the IP packet via the communication network interface, encodes and decodes the IP packet based on the encryption key and the decryption key.

A terminal according to the invention of claim 7, based on the invention of claim 5 or 6, is characterized by the broadcast wave interface discarding the IP packet having the IP address different from that of the terminal.

A communication method according to the invention of claim 8 includes a communication-network receiving step of receiving, via a communication network, an IP packet from a source terminal; a broadcast-wave transmitting step of transmitting the IP packet to a destination terminal by a digital broadcast wave; and a routing processing step of broadcasting the IP packet received from the source terminal via the communication network to the destination terminal.

A communication method according to the invention of claim 9 includes a routing processing step of judging, upon transmitting an IP packet to a particular terminal, whether the IP packet is to be transmitted to a relay apparatus based on a destination address of the IP packet, and setting the relay apparatus as a destination; a communication-network transmitting step of transmitting, to a communication network, the IP packet for which the particular terminal has been set as the destination at the routing processing step; and a broadcast-wave receiving step of receiving a digital broadcast wave and extracting an IP packet encapsulated therein.

Effect of the Invention

According to the relay apparatus, the communication terminal, and the communication method of the present invention, bidirectional communication with a particular communication terminal using a broadcast wave as the communication path can be achieved.

Figure 1:
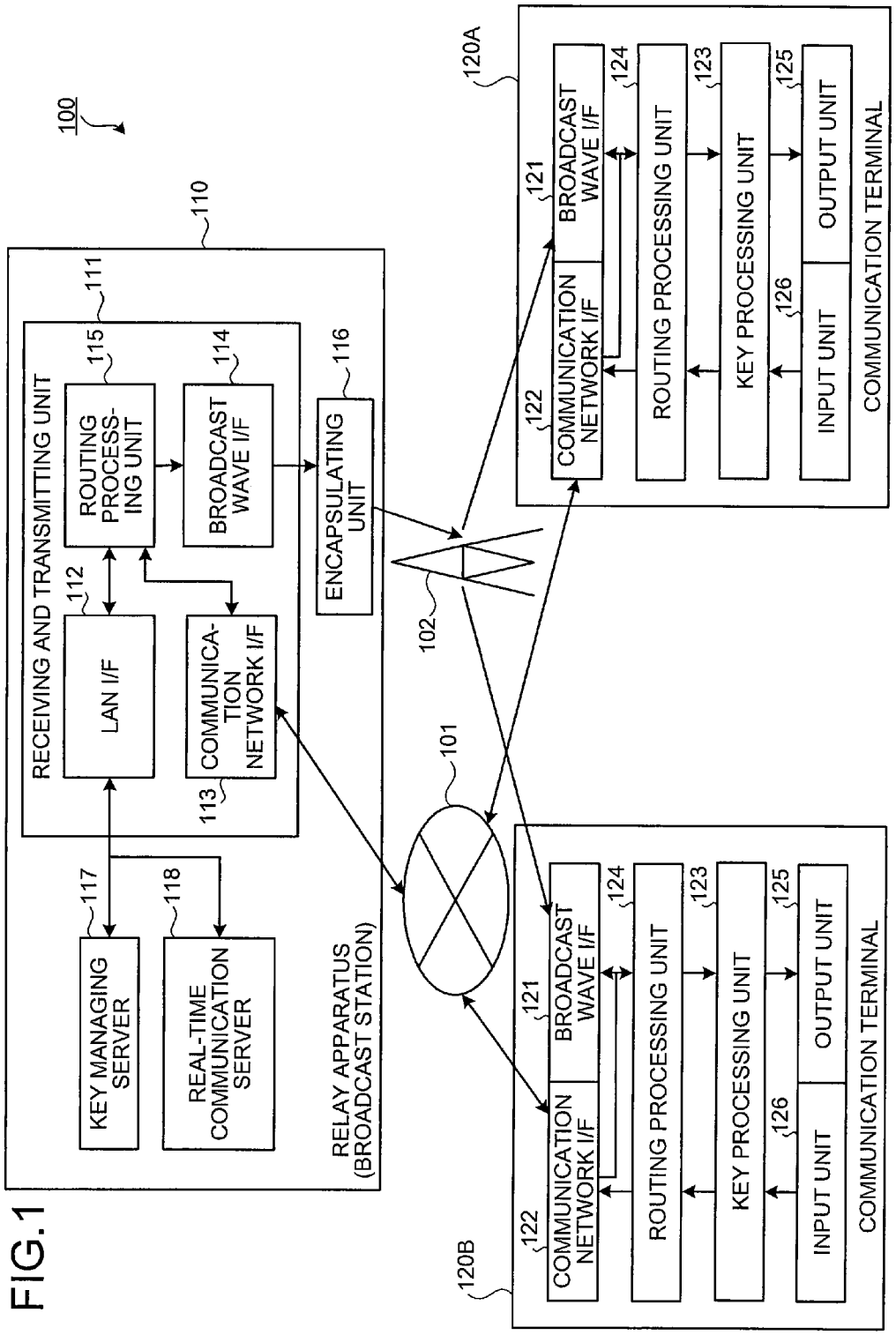
FIG. 1 is a block diagram of an overall configuration of a bidirectional communication system according to an embodiment of the present invention.

EXPLANATIONS OF LETTERS OR NUMERALS 100 bidirectional communication system
101 communication network
102 broadcast network
110 relay apparatus
111 receiving and transmitting unit
112 LAN I/F
113 communication network I/F
114 broadcast wave I/F
115 routing processing unit
116 encapsulating unit
117 key managing server
118 real-time communication server
120 (120A, 120B) communication terminal
121 broadcast wave I/F
122 communication network I/F
123 key processing unit
124 routing processing unit
125 output unit
126 input unit

BEST MODE(S) FOR CARRYING OUT THE INVENTION

Referring to the accompanying drawings, exemplary embodiments of the relay apparatus, the communication terminal, and the communication method according to the present invention are explained in detail below.
(Overall Configuration of Bidirectional Communication System)

FIG. 1 is a block diagram of an overall configuration of a bidirectional communication system according to an embodiment of the present invention. A bidirectional communication system 100 includes a relay apparatus 110 (provided at a facility such as a broadcast station that transmits a broadcast wave via a broadcast network 102) and communication terminals 120 (communication terminals 120A and 120B), and performs bidirectional communication between the communication terminals 120 via a communication network 101 and a broadcast network 102. The communication network 101 includes a fixed network, a mobile network, a wireless LAN, etc. The broadcast network 102 indicates a reception range of a digital broadcast wave.

For real-time bidirectional communication with a particular communication terminal using a broadcast wave, the relay apparatus that transmits the broadcast wave must identify each of the communication terminals 120 (120A and 120B). As a result, the data that is packetized according the Internet protocol (IP) is utilized as a common platform for a digital broadcast network (the broadcast network 102 shown in FIG. 1), a fixed network, a mobile network, and a wireless LAN (the communication network 101 shown in FIG. 1).

Furthermore, for real-time bidirectional communication, a communication path among the communication terminals 120 and the relay apparatus 110 must be established, and a session to maintain communication quality must be set. Therefore, a session is set using a given protocol for communication control. In the present embodiment, the communication session among the relay apparatus 110 and the communication terminals 120 is set based on the session initiation protocol (SIP), and IP packets are transmitted based on the real-time transport protocol (RTP).
(Configuration of Relay Apparatus)

A configuration of the relay apparatus 110 shown in FIG. 1 is explained. The relay apparatus 110 includes a receiving and transmitting unit 111, an encapsulating unit 116, a key managing server 117, and a real-time communication server 118. The receiving and transmitting unit 111 includes a LAN interface (I/F) 112, a communication network I/F 113, a broadcast wave I/F 114, and a routing processing unit 115.

The receiving and transmitting unit 111 fulfills a routing processing function through the routing control, by the routing processing unit 115, of the bidirectional communication between the communication terminals 120, the bidirectional communication using the communication network 101 and the broadcast wave transmitted via the broadcast network 102. The LAN I/F 112 is an interface connecting the receiving and transmitting unit 111 with the key managing server 117 and the real-time communication server 118 in response to a key issue request and a communication request received by the communication network I/F 113. The LAN I/F 112 further outputs data received from the key managing server 117 and the real-time communication server 118 to the communication network I/F 113 and the broadcast wave I/F 114.

The communication network I/F 113 receives an IP packet transmitted via the communication network 101 and outputs the IP packet to the routing processing unit 115 for processing to be performed according to the destination address and contents of the IP packet. The data output from the LAN I/F 112 is also output to the routing processing unit 115. The broadcast wave I/F 114 outputs data received from the routing processing unit 115 as the IP packet to the encapsulating unit 116. The routing processing unit 115 controls routing of the IP packet through the LAN I/F 112, the communication network I/F 113, and the broadcast wave I/F 114 based on the header information of the IP packet.

The encapsulating unit 116 encapsulates and outputs, to the broadcast network 102, the IP packet received from the broadcast wave I/F 114. Encapsulation involves using a transmission format such as the moving picture experts group 2 transport stream (MPEG2-TS), storing the IP packet in a payload and transmitting the IP packet.

The key managing server 117 issues and manages a key for encoding and decoding the IP packet. The real-time communication server 118 requests issue of the key for the real-time communication between the communication terminals and manages connection information. The real-time communication server 118 uses, for example, a server for the voice over Internet protocol (VoIP) in the case of the real-time verbal communication.

In the present embodiment, a common key cryptosystem (secret key cryptosystem), in which a key issued by the key managing server 117 is distributed to the communication terminals 120A and 120B, is used for encoding and decoding the IP packet. Although the case of using the common key cryptosystem will be explained hereinafter, the method of the encoding and the decoding is not limited thereto. For example, a public key cryptosystem may be used instead of the common key cryptosystem.

The common key cryptosystem is a method in which a source terminal encodes the IP packet using a widely-published encryption key, and a destination terminal decodes the IP packet using a decryption key strictly managed thereby. In the case of the public key cryptosystem, the key managing server 117 distributes the encryption key in response to a request by the source terminal.

(Configuration of Communication Terminal)

A configuration of the communication terminals 120 (120A, 120B) shown in FIG. 1 are explained. Each of the communication terminals 120 includes a broadcast wave I/F 121, a communication network I/F 122, a key processing unit 123, a routing processing unit 124, an output unit 125, and an input unit 126.

The broadcast wave I/F 121 receives a transmission packet transmitted via the broadcast network 102, and extracts an IP packet. The communication network I/F 122, connected to the communication network 101, receives and transmits an IP packet.

The key processing unit 123 stores the key issued by the key managing server 117, and performs encoding and decoding of the IP packet using the stored key. The routing processing unit 124 performs routing of the IP packet input by the input unit 126 and encoded by the key processing unit 123 based on the IP address in the header of the IP packet, and also routing of the IP packet received via the broadcast wave I/F 121 and the communication network I/F 122.

The output unit 125 outputs, to a user, data stored in the payload of the received IP packet. The data includes text data, image data, audio data, etc. The output unit 125 may include a display and a speaker to output images and audio. The input unit 126 receives data for the communication input by a user. The input unit 126 may include an operation key and a microphone for the input of data.

(Communication Method for Bidirectional Communication)

Figure 2:
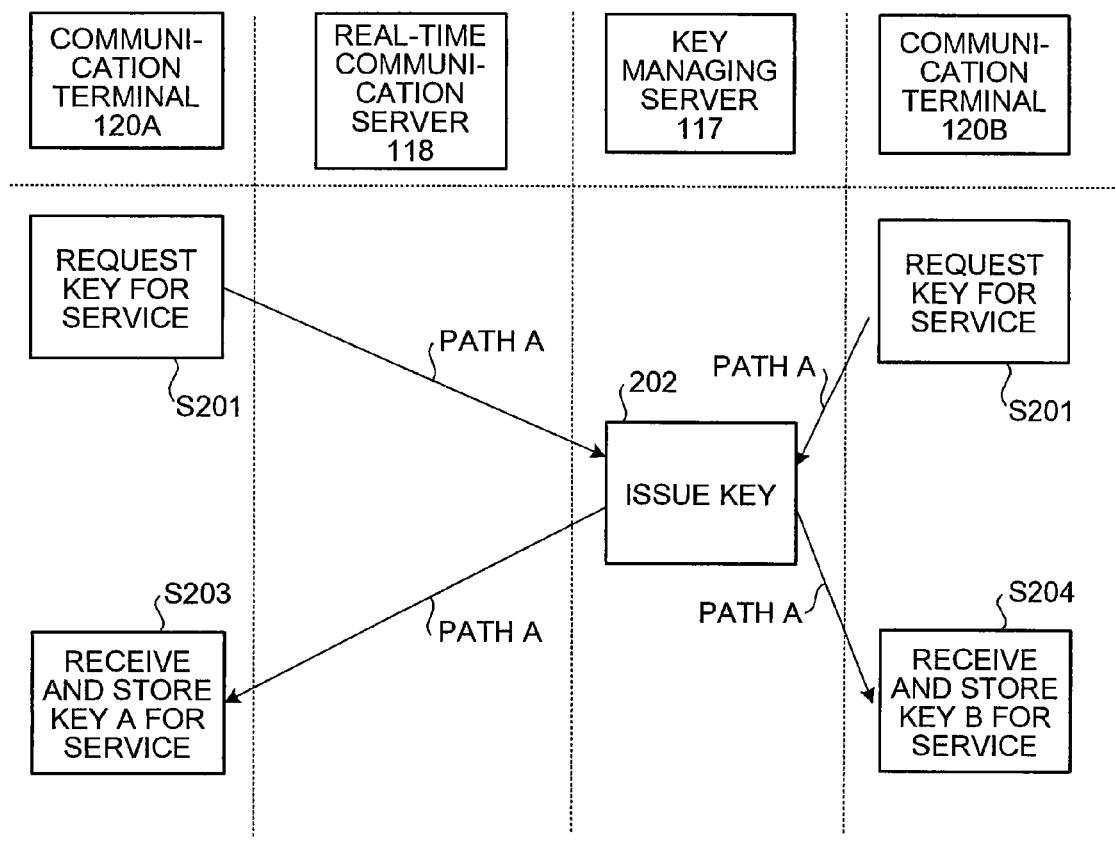
FIG. 2 is a flowchart of preliminary preparation for a communication method according to the embodiment.

FIG. 2 is a flowchart of preliminary preparation for the communication method according to the embodiment. Each of the communication terminals 120 (120A, 120B) requests a key (an encryption key and a decryption key) for the bidirectional communication service (step S201). Specifically, each of the communication terminals 120 transmits a key request signal to the key managing server 117 in the relay apparatus 110 via the communication network 101 (hereinafter, "path A"). When an actual provider provides a service, the provider causes the communication terminals 120 to buy a prepaid card on which a password for transmitting the key request signal is described, or charges the communication terminals 120 that transmits the key request signal.

The key managing server 117 issues a key to each of the communication terminals 120A and 120B in response to the key request signals from the communication terminals 120A and 120B (step S202). The communication terminal 120A receives a key A for the service from the key managing server 117 via the path A, and stores the key A (step S203). Meanwhile, the communication terminal 120B receives a key B for the service from the key managing server 117 via the path A, and stores the key B (step S204), and the preliminary preparation for the bidirectional communication ends.

Figure 3:
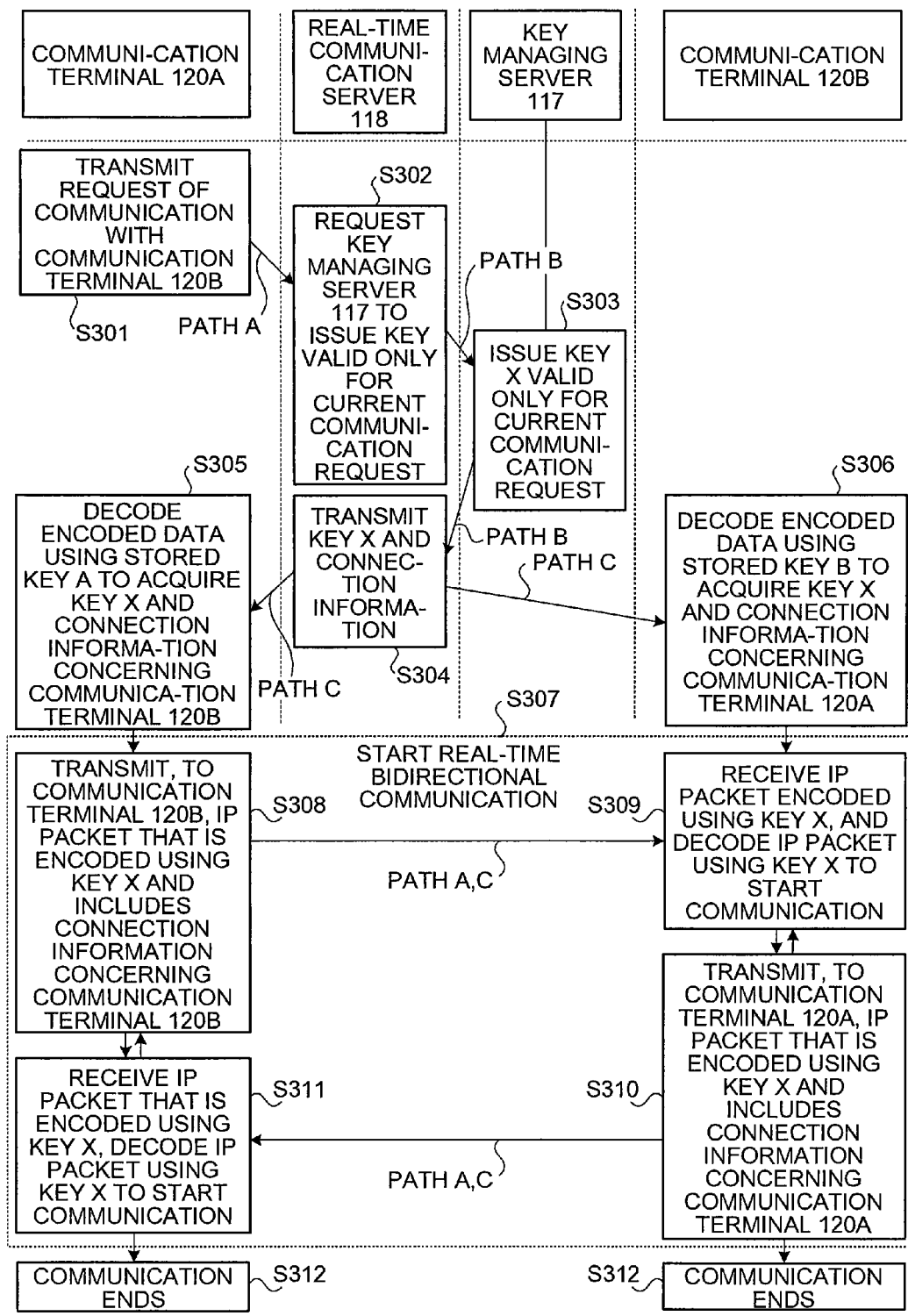
FIG. 3 is a flowchart of real-time bidirectional communication by the communication method according to the embodiment.

FIG. 3 is a flowchart of the real-time bidirectional communication by the communication method according to the embodiment. The operation of each functional unit in the case in which the communication terminal 120A communicates with the communication terminal 120B is explained.

The communication terminal 120A transmits, to the real-time communication server 118 via the path A, a signal to request communication with the communication terminal 120B (step S301). The real-time communication server 118, upon receiving the signal transmitted from the communication terminal 120A via the path A, requests the key managing server 117 to issue a key valid only for the current communication request (step S302). At this time, the real-time communication server 118 transmits the signal to request the issue of the key valid only for the current communication request to the key managing server 117 via a LAN network (hereinafter, "path B").

The key managing server 117, upon receiving the signal to request the issue of the key valid only for the current communication request via the path B, issues a key X valid only for the current communication request (step S303), and transmits the key X to the real-time communication server 118 via the path B.

The real-time communication server 118 transmits the key X received via the path B and connection information to the communication terminals 120A and 120B via the broadcast network 102 (hereinafter, "path C") (step S304). The connection information includes an IP address of the destination terminal and routing information. At this time, the key X and the connection information to be transmitted to the communication terminal 120A are encoded by the key A, and transmitted as encoded data. The key X and the connection information to be transmitted to the communication terminal 120B are encoded by the key B, and transmitted as encoded data.

The communication terminal 120A, upon receiving the encoded data via the path C, decodes the encoded data using the stored key A to acquire the key X and the connection information concerning the communication terminal B (step S305). Similarly, the communication terminal 120B, upon receiving the encoded data via the path C, decodes the encoded data using the stored key B to acquire the key X and the connection information concerning the communication terminal 120A (step S306).

The communication terminals 120A and 120B each acquiring the key X and the connection information concerning the destination terminal commences real-time bidirectional communication (step S307). The communication terminal 120A transmits, to the communication terminal 120B via the routing processing unit 124 and the communication network I/F 122, an IP packet including a payload encoded by the key processing unit 123 using the key X and the connection information concerning the communication terminal 120B stored in the header thereof, and communicates with the communication terminal 120B (step S308). The communication terminal 120B receives the IP packet from the communication terminal 120A. The IP packet is routed via the routing processing unit 124 to the key processing unit 123, where the payload thereof is decoded using the key X, and thereby, communication is performed (step S309).

Meanwhile, the communication terminal 120B transmits, to the communication terminal 120A via the routing processing unit 124 and the communication network I/F 122, an IP packet including a payload encoded by the key processing unit 124 using the key X and the connection information concerning the communication terminal 120A stored in the header thereof, and communicates with the communication terminal 120A (step S310). The communication terminal 120A receives the IP packet from the communication terminal 120B. The IP packet is routed via the routing processing unit 124 to the key managing unit 123, which decodes the payload using the key X, and thereby communication is performed (step S311).

As explained above, the operation at step S307 (steps S308 to S311) is performed in response to the communication request by each user of the communication terminals 120A and 120B, achieving the real-time bidirectional communication. When the communication requests from the communication terminals 120A and 120B are stopped, the communication ends (step S312).

In the operation at step S307, the IP packet is transmitted via the paths A and C. The communication paths A and C will be explained in detail. Referring to FIGS. 4 to 7, operations in the case in which the communication terminal 120A communicates with the communication terminal 120B will be explained. The communication from the communication terminal 120A to the communication terminal 120B is achieved by performing transmission from the communication terminal 120A to the relay apparatus 110 (see FIGS. 4 and 5), and transmission from the relay apparatus 110 to the communication terminal 120B (see FIGS. 6 and 7).

Figure 4:
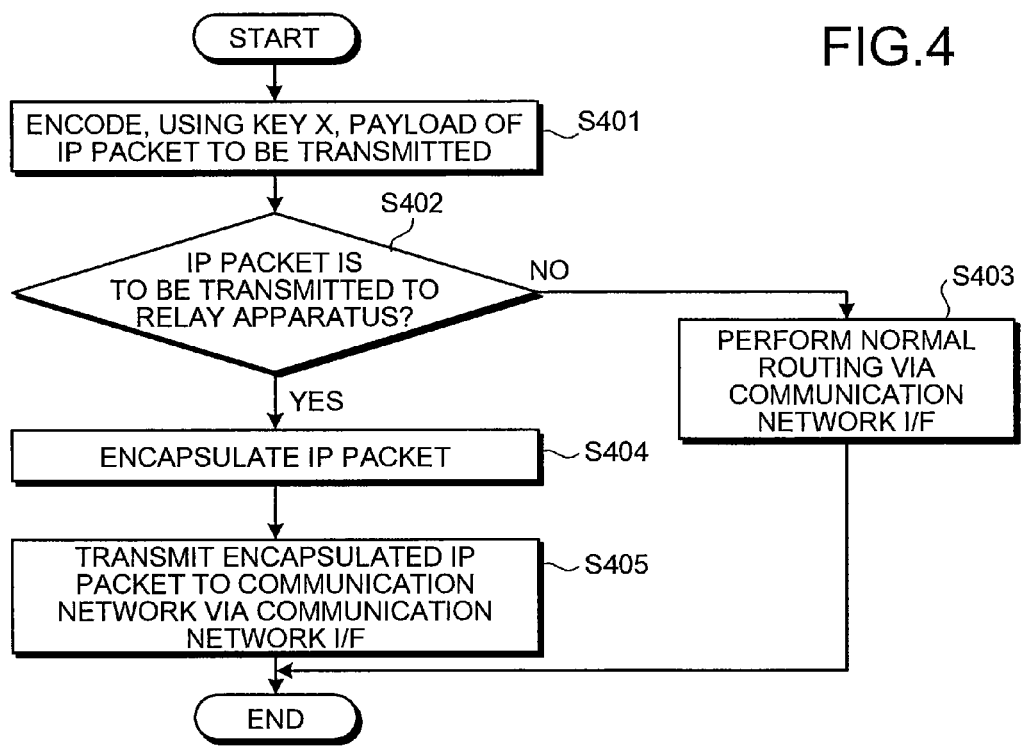
FIG. 4 is a flowchart of a process performed by a source terminal.

FIG. 4 is a flowchart of a process performed by a source terminal. The key processing unit 123 encodes, using the key X, a payload of the IP packet to be transmitted to a destination terminal (step S401). It is judged whether the IP packet is to be transmitted to the relay apparatus 110 (step S402). This judgment is performed by referring to the header information of the IP packet and a routing table stored in the routing processing unit 124.

When it is judged that the IP packet is not to be transmitted to the relay apparatus 110 (step S402: NO), the routing processing unit 124 performs normal routing via the communication network I/F 122 based on the IP address stored in the header of the IP packet (step S403), and the process ends.

On the contrary, when it is judged that the IP packet is to be transmitted to the relay apparatus 110 (step S402: YES), the IP packet is encapsulated for transmission via the communication network 101 (step S404). The encapsulation at this step is different from the encapsulation in the transmission format of MPEG2-TS for the broadcast network 102 explained above. The encapsulation at step S404 is an encapsulation to add an address to the IP packet so that the communication network I/F 113 in the relay apparatus 110 can receive IP packet transmitted via the communication network 101. The encapsulated IP packet is transmitted to the communication network 101 via the communication network I/F 122 (step S405), the process ends.

Figure 5:
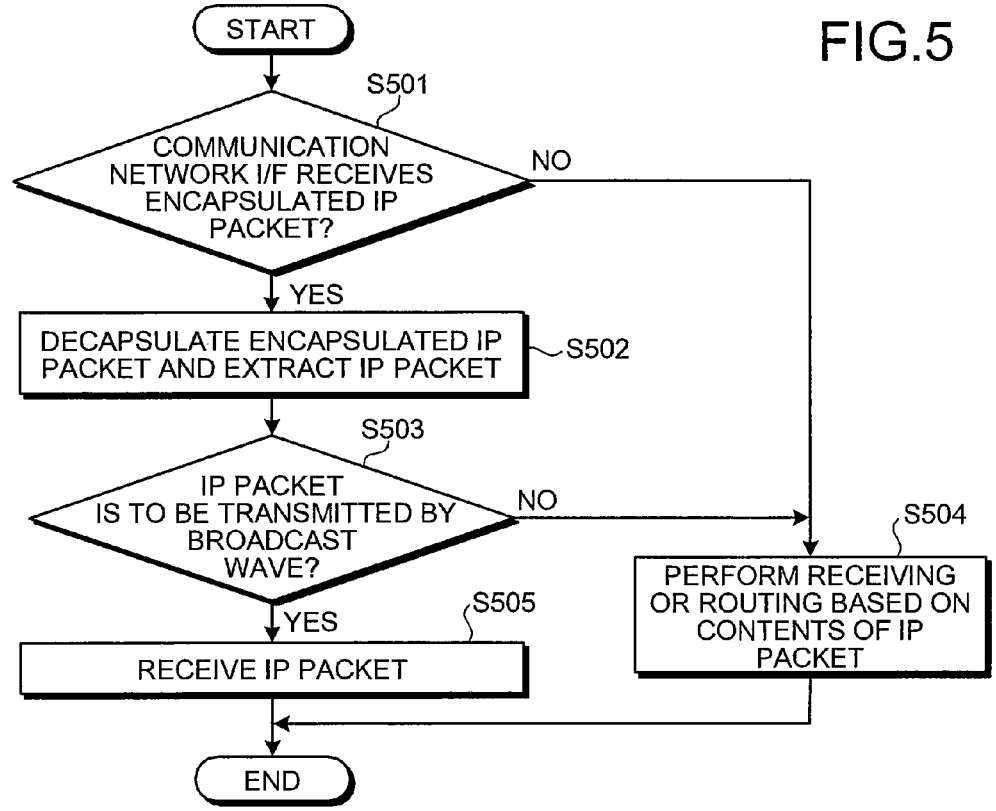
FIG. 5 is a flowchart of a process performed by a relay apparatus upon communicating with a destination terminal.

FIG. 5 is a flowchart of a process performed by the relay apparatus in the case of communicating with the destination terminal. It is judged whether the communication I/F 113 has received an encapsulated IP packet (step S501). The encapsulation is performed at step S404 shown in FIG. 4. When the communication I/F 113 does not receive an encapsulated IP packet (step S501: NO), receiving or routing is performed based on the header information of the received IP packet since the communication I/F 113 has received a normal IP packet that is not encapsulated (step S504).

When the communication I/F 113 receives an encapsulated IP packet (step S501: YES), the communication network I/F 113 decapsulates the encapsulated IP packet to extract the IP packet (step S502). It is judged whether the extracted IP packet is to be transmitted by a broadcast wave (step S503). This judgment is performed by referring to the header information of the IP packet and a routing table stored in the routing processing unit 124.

When the extracted IP packet is not to be transmitted by the broadcast wave (step S503: NO), receiving or routing is performed based on the contents of the IP packet (step S504), and the process ends. When the extracted IP packet is to be transmitted by the broadcast wave (step S503: YES), the IP packet is received as if the IP packet had been received via the broadcast wave I/F 114 (step S505), routing is performed, and the process ends.

In the embodiment, a virtual bidirectional-communication path is set using the uni-directional link routing (UDLR). The UDLR is a unique routing method in the case of a one-way communication.

Figure 6:
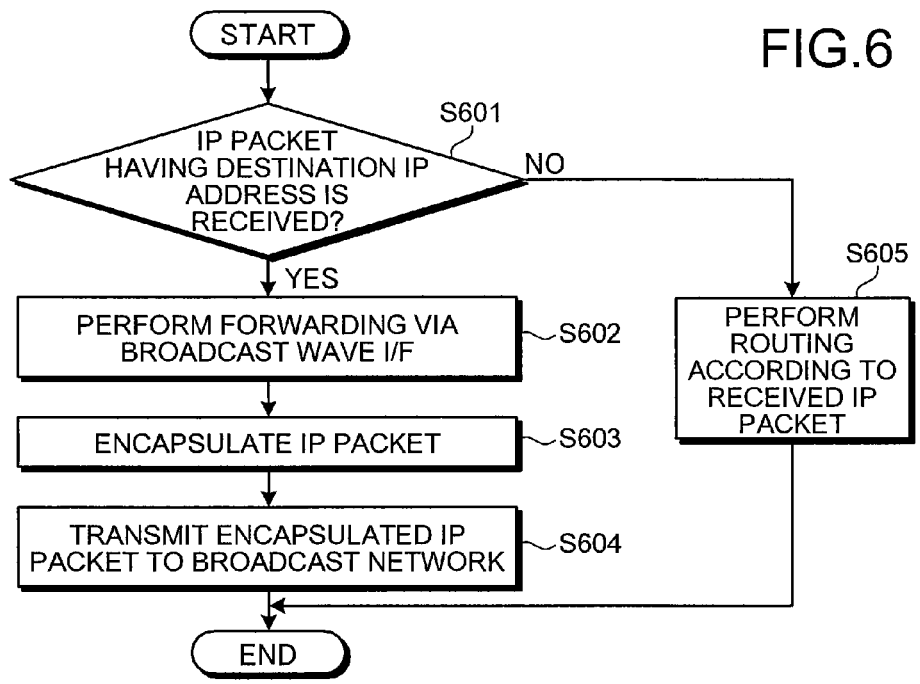
FIG. 6 is a flowchart of a process performed by the relay apparatus upon receiving an IP packet.

FIG. 6 is a flowchart of a process performed by the relay apparatus upon receiving an IP packet. It is judged whether an IP packet having the IP address of the communication terminal 120B, the destination terminal of the communication by the broadcast wave, is received (step S601). When an IP packet having the address of the communication terminal 120B as the destination IP address is not received (step S601: NO), a normal IP packet that is not to be transmitted by the broadcast wave has been received and, routing is performed based on the contents of the received IP packet (step S605), and the process ends.

When an IP packet having the address of the communication terminal 120B as the destination IP address is received (step S601: YES), forwarding is performed via the broadcast wave I/F 114 (step S602). The forwarding is a process to retransmit the IP packet by the broadcast wave via the broadcast network 102 to the communication terminal 120B specified by the destination IP address.

Therefore, the encapsulating unit 116 encapsulates the IP packet (step S603). The IP packet is encapsulated using the transmission format of the MPEG2-TS as an encapsulating method of the IP packet to be transmitted by the broadcast wave. The encapsulated IP packet is transmitted to the broadcast network 102 (step S604), and the process ends.

Figure 7:
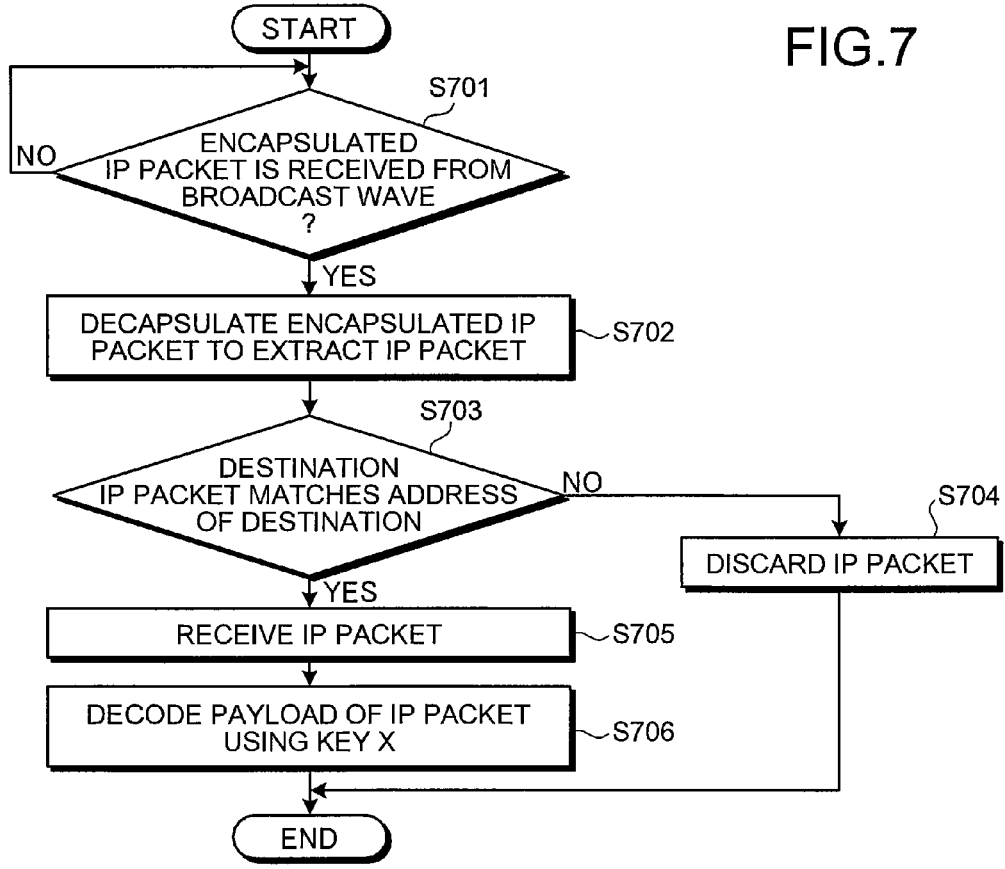
FIG. 7 is a flowchart of a process performed by the destination terminal.

FIG. 7 is a flowchart of a process performed by the destination terminal. It is judged whether an encapsulated IP packet is received via the broadcast wave (step S701). When an encapsulated IP packet is not received (step S701: NO), the process returns to step S701.

When an encapsulated IP packet is received (step S701: YES), the broadcast wave I/F 121 decapsulates the encapsulated IP packet to extract the IP packet (step S702). It is judged whether the destination address of the IP packet matches the address of the destination terminal (120B in this case) (step S703).

When the destination address of the IP packet does not match the address of the destination terminal (step S703: NO), the IP packet is discarded (step S704), and the process ends. When the destination address of the IP packet matches the address of the destination terminal (step S703: YES), the IP packet is received (step S705). The key processing unit 123 decodes the payload of the IP packet using the key X (step S706), and the process ends.

Though the case in which an IP packet is encoded to be transmitted is explained in the embodiment, the IP packet can be transmitted without being encoded. When the IP packet is encoded, leak of the data to be transmitted can be prevented and the communication with a high degree of confidentiality can be achieved. On the contrary, when the IP packet is not encoded, the processing of acquiring the key for encryption or decryption, and the processing of encoding or decoding the IP packet using the acquired key can be omitted, achieving high speed communication with simple processing. Thus, a user can select whether the encoding is performed according to a kind of IP packet to be transmitted.

As explained above, according to the communication terminal and the communication method using the broadcast wave, real-time bidirectional communication between particular communication terminals can be performed using the broadcast wave for the communication from the relay apparatus to the communication terminal. Furthermore, a functional extension to a multicasting service can be enabled by setting plural IP addresses of destination terminals and the IP address of a particular group.

Particularly, according to the relay apparatus, the communication terminal, and the communication method of the present invention, existing towers can be used for transmitting broadcast waves; hence, a new communication path can be established without the provision of a new facility. At the same time, load on the communication paths using the conventional communication networks can be reduced.

Moreover, the communication services can be provided by a broadcast provider, the broadcast business and the communication business can be combined to provide a new form of service.

The communication method explained in the present embodiment can be implemented by a computer, such as a personal computer and a workstation, executing a program that is prepared in advance. This program is recorded on a computer-readable recording medium such as a hard disk, a flexible disk, a CD-ROM, an MO, and a DVD, and is executed by being read out from the recording medium by a computer. This program can be a transmission medium that can be distributed through a network such as the Internet.

INDUSTRIAL APPLICABILITY

As explained above, the relay apparatus, the communication terminal, and the communication method according to the present invention is useful for transmitting IP packets in terrestrial digital broadcasting, and is particularly suitable for the real-time communication.

The invention claimed is:

1. A relay apparatus comprising:
a communication network interface that receives, via a communication network, an IP packet from a source terminal;
a broadcast wave interface for transmitting the IP packet, received via the communication network interface, to a destination terminal via a digital broadcast wave over a broadcast network, said communication network and said broadcast network are two different networks; and
a routing processing unit that broadcasts, from the broadcast wave interface, the IP packet received from the source terminal via the communication network, to the destination terminal,
wherein the relay apparatus is configured to establish at least one path via said communication network interface and another path via said broadcast wave interface so that a bidirectional communication between the source terminal and the destination terminal is performed via said one path and another path in a real time, and
wherein the relay apparatus is configured to send a first key to each of the source terminal and the destination terminal via the communication network and a second key to each of the source terminal and the destination terminal via the broadcast network, said second key is encrypted by the first key, and
wherein the first key of the source terminal is different from the first key of the destination terminal and the second key of the source terminal is same as the second key of the destination terminal, said second key is valid only for one communication.

2. The relay apparatus according to claim 1, further comprising a real-time communication unit that acquires address information of a plurality of terminals between which the IP packet is exchanged via the routing processing unit, and monitors a connection state.

3. The relay apparatus according to claim 2, further comprising: a key issuing unit that issues, to the terminals, an encryption key and an decryption key for the IP packet to be exchanged among the terminals; issue information of the encryption key and the decryption key; and a key-information storing unit that stores addresses of the terminals issued the encryption key and the decryption key, wherein the real-time communication unit requests, upon receiving, from any of the terminals, an IP packet requesting bidirectional communication, the key issuing unit to issue the encryption key and the decryption key.

4. The relay apparatus according to claim 3, further comprising an encapsulating unit that encapsulates the IP packet to be transmitted to the broadcast network via the broadcast wave interface to generate a transmission packet for the digital broadcast wave.

5. A terminal comprising:
a routing processing unit that judges, upon transmitting an IP packet to a particular terminal, whether the IP packet is to be transmitted to a relay apparatus based on a destination address of the IP packet, and sets the relay apparatus as a destination;
a communication network interface that transmits, to a communication network, the IP packet for which the particular terminal has been set as the destination by the routing processing unit; and
a broadcast wave interface that receives a digital broadcast wave over a broadcast network and extracts an IP packet encapsulated therein, said communication network and said broadcast network are two different networks, and
wherein the communication network interface is configured to receive a first key from the relay apparatus via the communication network and the broadcast wave interface is configured to receive a second key from the relay apparatus via the broadcast network, said second key is encrypted by the first key, and
wherein the first key of the terminal is different from the first key of the particular terminal and the second key of the terminal is same as the second key of the particular terminal, said second key is valid only for one communication.

6. The terminal according to claim 5, further comprising a key processing unit that requests the relay apparatus to issue an encryption key and a decryption key for transmitting the IP packet via the communication network interface, encodes and decodes the IP packet based on the encryption key and the decryption key.

7. The terminal according to claim 5, wherein the broadcast wave interface discards the IP packet having the IP address different from that of the terminal.

8. A communication method comprising:

a communication-network receiving step of receiving, via a communication network, an IP packet from a source terminal;

a broadcast-wave transmitting step of transmitting the IP packet to a destination terminal by a digital broadcast wave over a broadcast network, said communication network and said broadcast network are two different networks; and a routing processing step of broadcasting the IP packet received from the source terminal via the communication network to the destination terminal;

a step of establishing at least one path and another path so that a bidirectional communication between the source terminal and the destination terminal is performed via said one path and another path in a real time;

a step of sending a first key to each of the source terminal and the destination terminal via the communication network;

a step of sending a second key to each of the source terminal and the destination terminal via the broadcast network; and a step of encrypting said second key by the first key, wherein the first key of the source terminal is different from the first key of the destination terminal and the second key of the source terminal is same as the second key of the destination terminal, said second key is valid only for one communication.

9. A communication method of a terminal, comprising:

a routing processing step of judging, upon transmitting an IP packet to a particular terminal, whether the IP packet is to be transmitted to a relay apparatus based on a destination address of the IP packet, and setting the relay apparatus as a destination;

a communication-network transmitting step of transmitting, to a communication network, the IP packet for which the particular terminal has been set as the destination at the routing processing step; and a broadcast-wave receiving step of receiving a digital broadcast wave over a broadcast network and extracting an IP packet encapsulated therein, said communication network and said broadcast network are two different networks, wherein a communication-network receiving step of receiving a first key from the relay apparatus via the communication network and the broadcast-wave receiving step of receiving a second key from the relay apparatus via the broadcast network, said second key is encrypted by the first key, and wherein the first key of the terminal is different from the first key of the particular terminal and the second key of the terminal is same as the second key of the particular terminal, said second key is valid only for one communication.

10. A system, comprising:

a relay apparatus including a communication network interface that receives, via a communication network, an IP packet from a source terminal;

a broadcast wave interface for transmitting the IP packet, received via the communication network interface, to a destination terminal via a digital broadcast wave over a broadcast network, said communication network and said broadcast network are two different networks; and a routing processing unit that broadcasts, from the broadcast wave interface, the IP packet received from the source terminal via the communication network, to the destination terminal, wherein the relay apparatus is configured to establish at least one path via said communication network interface and another path via said broadcast wave interface so that a bidirectional communication between the source terminal and the destination terminal is performed via said one path and another path in a real time, and wherein the relay apparatus is configured to send a first key to each of the source terminal and the destination terminal via the communication network and a second key to each of the source terminal and the destination terminal via the broadcast network, said second key is encrypted by the first key, and wherein the first key of the source terminal is different from the first key of the destination terminal and the second key of the source terminal is same as the second key of the destination terminal, said second key is valid only for one communication.

* * * * *